Dec. 19, 1950 — L. I. PICKERT — 2,534,622
LOAD COMPENSATED AIR BRAKE
Filed July 30, 1948 — 4 Sheets-Sheet 1

Inventor
Lynn I. Pickert
Dodge and Ims.
Attorneys

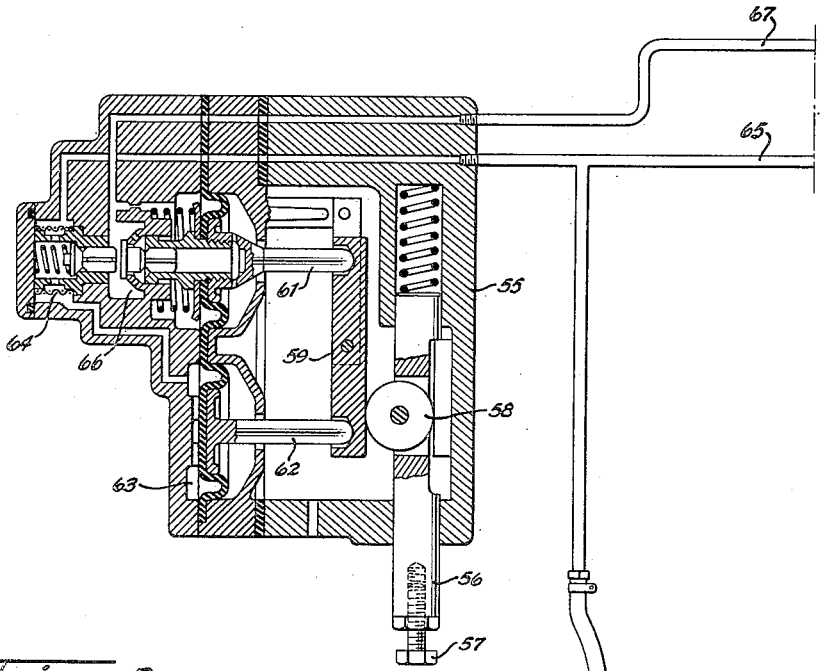
Fig. 2.
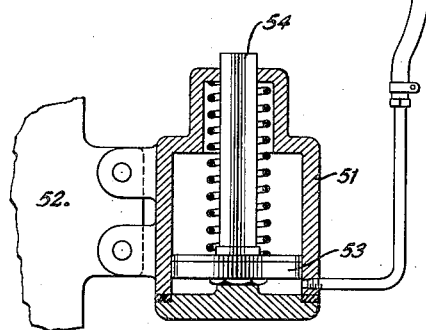

Dec. 19, 1950  L. I. PICKERT  2,534,622
LOAD COMPENSATED AIR BRAKE
Filed July 30, 1948  4 Sheets-Sheet 3

Inventor
Lynn I. Pickert
By Dodge and Ims
Attorneys

Dec. 19, 1950     L. I. PICKERT     2,534,622
LOAD COMPENSATED AIR BRAKE
Filed July 30, 1948     4 Sheets-Sheet 4

Inventor
Lynn I. Pickert
By
Dodge & Co.
Attorneys

Patented Dec. 19, 1950

2,534,622

UNITED STATES PATENT OFFICE 2,534,622

LOAD COMPENSATED AIR BRAKE

Lynn I. Pickert, Watertown, N. Y., assignor to The New York Air Brake Company, a corporation of New Jersey Application July 30, 1948, Serial No. 41,500

7 Claims. (Cl. 303—22)

This invention relates to air brakes and particularly to load compensated brakes of the type commercially known as the ABLC.

This is a commercial brake. Since the invention involves only the weighing mechanism, the invention can be completely disclosed by illustrating the weighing mechanism and the related compensating valve which is modified slightly from the form used in the present commercial ABLC brake.

For record purposes there is filed with this application a copy of a publication of The New York Air Brake Company entitled "CI-1217—Load Compensating Brake Equipment for Freight Cars (adjusts the braking force to the car load), April 1947."

The complete equipment for one car is diagrammed in Fig. 2 of the above publication. The apparatus illustrated in the drawing of the present application replaces that shown in the lower right-hand corner of said Fig. 2, namely, the compensating valve and the weighing gear. The compensating valve is identical with that shown in CI-1217 except for the motors which position the adjustable fulcrum of the variable ratio relay.

The weighing gear shown in Fig. 2 of CI-1217 transmits its indication mechanically. The weighing gear forming the subject matter of the present invention transmits its indication pneumatically from the truck to the compensating valve. This has a number of advantages. Two simple tubes extend from the truck to the compensating valve. The mechanism, in slightly modified forms, can determine the load on one truck and adjust the compensating valve according to that determination. Alternatively, it can determine the load on each truck and transmit the indication in such a way that the indication of load on the more lightly loaded truck determines the setting of the compensating valve. This is the preferred arrangement.

Another possibility illustrated in the drawings is the use of applicant's weighing gear on each truck in conjunction with an averaging valve which transmits to the compensating valve an indication proportioned to the average of the load on the two trucks.

ABLC equipment comprises an ABEL brake valve, a three compartment reservoir, a compensating brake cylinder having a large brake applying working space and a smaller annular working space (called the compensating chamber), a slack adjuster and a retainer, none of which parts is included in applicant's drawings and all of which may be used in their present commercial form. In addition, the equipment includes a compensating valve and a related weighing gear which are here illustrated in the novel form proposed by applicant.

The third chamber in the reservoir furnishes air to energize the compensating chamber, the flow of air to said chamber being controlled by the compensating valve. The compensating chamber comprises an annular working space in which pressure so controlled opposes the braking force developed by the brake cylinder. In a fully loaded car the compensating chamber is not charged, so the brakes apply with full force. Thus, the minimum quantity of air is used during applications on a loaded car. In an empty car the compensating chamber is charged during application as fully as the apparatus permits so that the application is minimized. The maximum air consumption occurs during brake applications on empty cars. At intermediate loads the compensating valve charges the compensating chamber to pressures which are fractions of the main brake cylinder pressure inversely proportioned to load.

The above statement gives the environment in which the invention is used. According to the invention, the sensing device is mounted on one truck or two sensing devices are used, one being mounted on each truck. All sensing devices are caused to cycle during release following an emergency application by a valve mechanism identical with that which forms a part of the conventional compensating valve.

Each sensing means comprises two components, one of which is mounted on a spring borne portion of the truck, and the other of which is mounted on a portion of the truck which is not spring borne. The precise arrangement will depend on the design of the truck and no attempt to illustrate mounting details is made. One component is merely a piston which moves a stop a fixed distance to and from its active position. The other component comprises a variable ratio pressure reducing valve basically similar to the variable ratio relay valve forming part of the conventional ABLC compensating valve, but reversely arranged for reasons to be explained later.

The extent to which the spring borne part of the truck is depressed by load is proportional to load and determines the adjustment of the compensating valve. In a single truck installation, the controlling pressure is transmitted to the adjusting piston of the compensating valve and sets that valve to control pressure in the compensating chamber of the brake cylinder according to principles inherent in the operation of the ABLC valve.

Where a load sensing mechanism is mounted on each of two trucks of the car, there are two possible arrangements. In one a switch valve connects that variable ratio relay which develops the lower pressure in controlling relation with the adjusting motor of the compensating valve. This is the preferred arrangement. The other arrangement involves the use of an averaging valve which senses both indications produced by the truck mounted valves and transmits the average of the two indications to the adjusting motor of the compensating valve.

The above being the general principle of the invention, the preferred embodiment will now be described by reference to the accompanying diagrammatic drawings in which:

Figs. 2 and 3 represent the truck mounted load sensing units. The views are mirror duplicates and it will be assumed that these units are mounted on trucks at the opposite ends of the same car.

Figure 1:
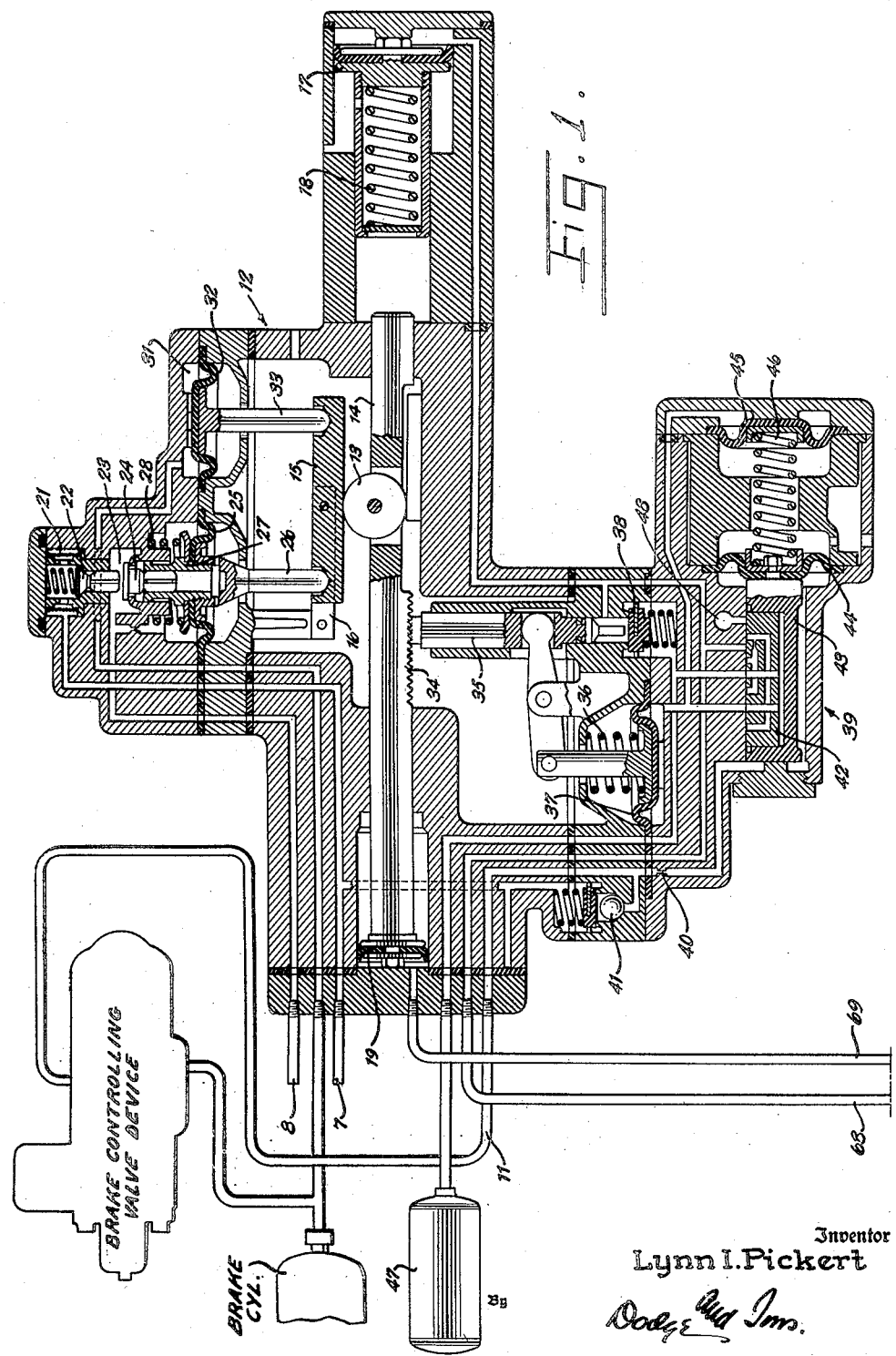
Fig. 1 is a longitudinal section of the ABLC compensating valve modified according to the invention. The adjustable fulcrum is shown in "no load" position and the parts are shown in the positions which they assume when the brake pipe is vented.
Figure 3:
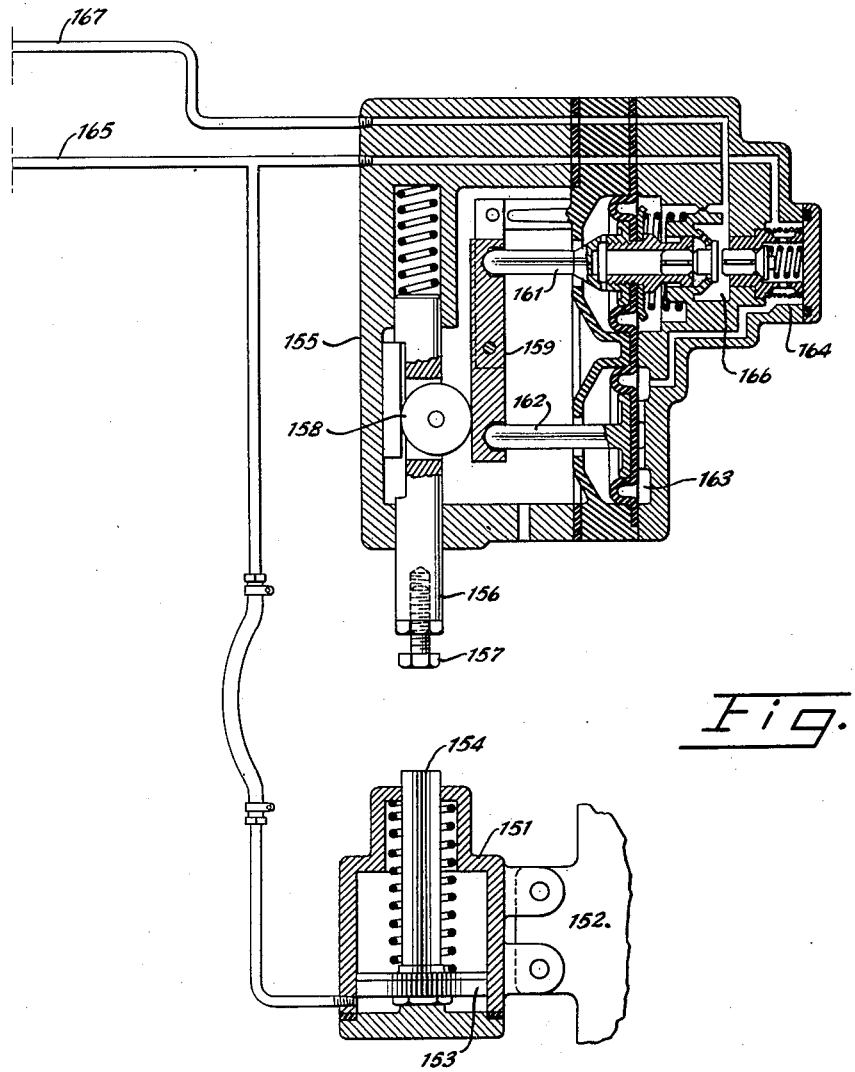
Figure 4:
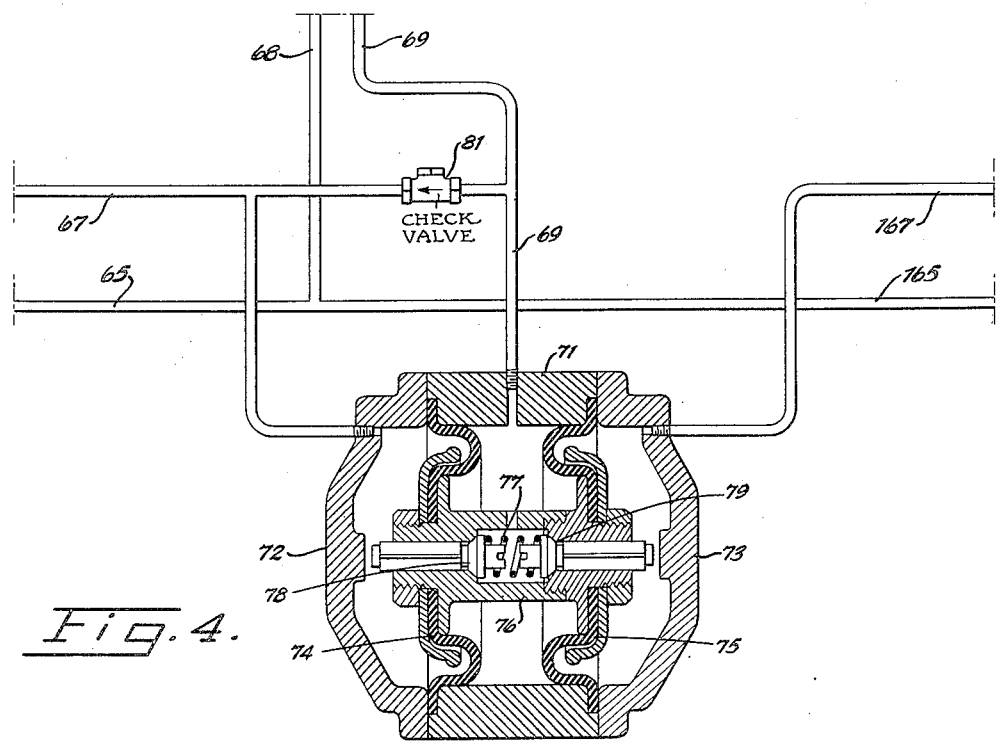
Fig. 4 is a sectional view of the switch valve used in the preferred embodiment.

NOTE.—A diagram of the complete system including the switch valve may be had by assembling Figs. 2, 4 and 3 left to right, in the order stated, and assembling Fig. 1 above these figures. In making this assembly of figures the similarly numbered pipes should be arranged in register.

Figure 5:
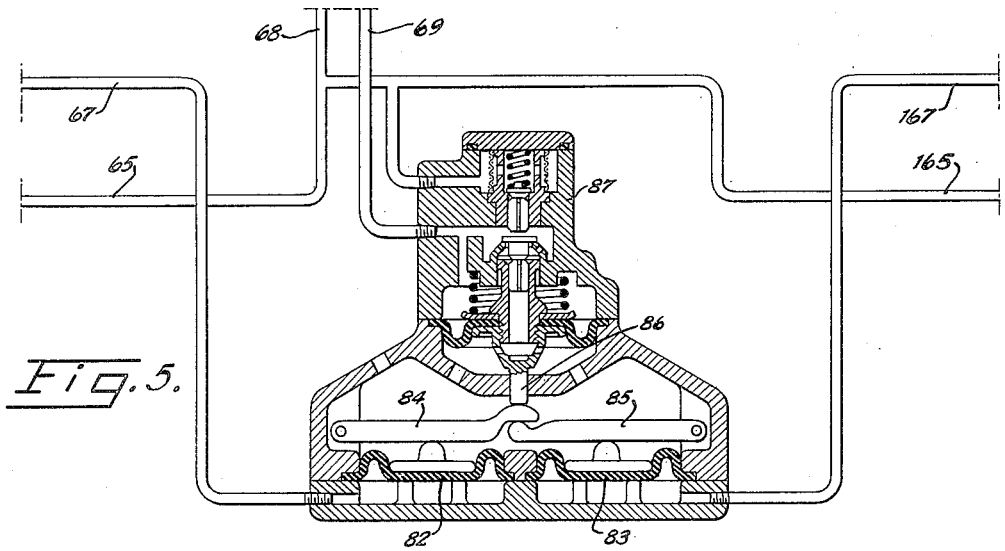
Fig. 5 is a perspective view of an averaging relay which may be used to afford an averaged indication.

Similarly, a diagram of the system using an averaging relay may be had by assembling Figs. 2, 5 and 3 left to right, in the order stated and assembling Fig. 1 above the three figures.

To indicate the identity of pipe connections to the compensating valve of Fig. 1 with pipes identified in Fig. 2 of CI-1217, these pipes are here numbered as they are numbered in said Fig. 2. These are, the brake cylinder pipe 3, the compensating reservoir pipe 7, the compensating chamber pipe 8 and the brake pipe 11. The compensating valve as a whole is indicated at 12.

For a single-truck installation the weighing gear could be represented by Fig. 2. For a two truck installation using the switch valve it would be represented by the assembled structure of Figs. 2, 4 and 3. For a two truck installation using the averaging relay it would be represented by the assembled Figs. 2, 5 and 3.

*The compensating valve*

The adjustable element of the compensating valve is a fulcrum roller 13 mounted on a longitudinally movable rod 14. The roller supports a lever 15 at various points in its length. The lever 15 is held against longitudinal motion by a drag link 16, which is pinned to the middle of lever 15 at one end and pinned to a fixed support at its other end.

The mechanism which shifts the rod 14 longitudinally differs in detail from that shown in CI-1217. A piston 17 working in a cylinder clearly shown in the drawing carries a loading spring 18. In the initial portion of the load-sensing cycle, the piston 17 is subjected to pneumatic pressure, moves to the left and sets spring 18 in position to bias the rod 14 to the left, that is, towards its "no load" position. Thereafter, the load-sensing device develops pressure on piston 19 which is at the left end of rod 14 and causes it to move the rod 14 back to the right, against the resistance of spring 18, a distance which is determined by the pressure so developed against the piston 19. This pressure is a pneumatic pressure controlled by the load-sensing function of the truck-mounted apparatus hereinafter described.

The remainder of the compensating valve adheres to commercial practice and can be described in general terms. The compensating reservoir line 7 leads to an air supply chamber 21 beneath which is the poppet inlet valve 22. Beneath inlet valve 22 is the compensating valve chamber 23 with which the pipe 8 connects. This is the pipe leading to the compensating chamber of the brake cylinder. Controlling exhaust from the chamber 22 is the exhaust valve 24. A diaphragm 25 carries the stem 26 which engages the left end of the lever 15. The seat for exhaust valve 24 is carried by the central diaphragm-clamping member 27 attached to the upper end of stem 26. The usual loading spring appears at 28.

Brake cylinder pressure conducted through pipe 3 reacts in chamber 31 on diaphragm 32 and through stem 33 connected with the center of the diaphragm on the right-hand end of lever 15. From the construction above described it follows that for every pressure developed in chamber 31 a proportional pressure will be created in chamber 23. The proportioning is variable and depends on the adjusted position of fulcrum roller 13.

The rod 14 is toothed as indicated at 34 and is there normally engaged and fixed in position by a toothed latch 35. The latch is biased to engage by spring 36, but is capable of being disengaged when diaphragm 37 is forced upward by pressure developed beneath it during the load-sensing cycle. The lower end of the stem of latch 35 functions when the latch is disengaged to unseat a spring-loaded check valve 38.

The brake pipe connection 11 leads to the cut off valve generally indicated by the numeral 39. It has a branch which leads through a charging check valve 41 to the connection 7 and consequently to the third chamber in the three compartment reservoir which supplies air for the compensating valve. Immediately beyond the connection to the charging valve 41 there is a constriction 40 which is provided to choke pressure surges and prevent their interfering with the operation of the cut off valve and related parts.

The cut off valve comprises a slide valve 42 confined in a notch in the stem 43 which is connected to a motor diaphragm 44. Spaced from the diaphragm 44 is a second diaphragm 45, of equal area. Reacting between the two diaphragms is a coil compression loading-spring 46. The slide valve 42 has two through-ports which register with seat-ports when the stem 43 is in its left-hand position as shown in Fig. 1. One of these ports leads directly to the space below diaphragm 37 and the other leads directly to the space below check valve 38 and also to a volume reservoir 47.

The seat of the valve has a third port connected with the space to the right of piston 17 and to the space above the valve 38. In the seat there is an exhaust port 48. The slide valve 42 has two loop ports which are blanked in the illustrated position of the valve but function when the valve moves to the right to the limit of its motion. One of these loop ports then connects the space below diaphragm 37 freely with the exhaust port 48. The other loop port is formed with a restriction. In the limiting right-hand position of valve 42 it connects the space below the valve 38, and also the port which leads to the space to the right of piston 17, through this restriction to exhaust port 48.

It will be helpful at this point to trace the cycle of the cut-off valve. During running conditions the compensating volume reservoir will have been charged. If the brake pipe has been vented as it is after an emergency application, or as it is on a car which has been cut out of a train and bled, all parts of the compensating valve would be in the positions shown in Fig. 1. Assuming that pressure now starts to rise in pipe 11, the first effect of pressure development in the valve chamber of slide-valve 42 is flow to the space below the diaphragm 37 which will retract the latch 35 and free rod 14. Thereupon the valve 38 will be unseated and air will flow through the slide valve and past the valve 38 to the space to the right of piston 17. The piston 17 moves to the left and remains there throughout the load-sensing cycle which ends when pressure beyond choke 40 reaches about 45 lbs. The pressure beyond choke 40 is the pressure in the chamber of cut-off slide valve 42.

The admission of air below the diaphragm 37 entails simultaneous admission of air to the right of diaphragm 45 so that the spring 46 is rather heavily stressed and strongly resists motion of the valve 42 and diaphragm 44 to the right. However, when pressure beyond choke 40 reaches 45 p. s. i., the valve will start to move to the right. The effects are immediate venting of the space below diaphragm 37 (and consequent re-engagement of latch 35), and simultaneous immediate venting of the space to the right of diaphragm 45. The consequent reduction of stress in spring 46 allows diaphragm 44 and valve 42 to move to their limiting right-hand positions where they remain so long as operating pressure is maintained in the brake pipe. In this position the space to the right of piston 17 and certain connected spaces are also vented, but are vented comparatively slowly.

It should be observed that the first event in the cycle just mentioned is release of latch 35. The next event is the development of spring bias on the rod 14 urging it toward "no load" position. As will be explained later, the next event in the operation of the compensating valve is adjustment of the relay according to a load indication, but ignoring that for the present, the effects when pressure beyond choke 40 reaches the terminal value here assumed to be 45 p. s. i., are first the re-engagement of the latch, and then the dissipation of the biasing load on spring 18.

It follows that the compensating valve is adjusted first to "no load" position, and then to a selected load position against a "no load" bias. It will be locked in whatever its adjusted position may be before the bias toward "no load" position is dissipated. Thus, failure is on the side of safety, it being safer to use a "no load" setting on a loaded car than a loaded setting on an empty car.

Load-sensing relay

Refer now to Fig. 2. In Fig. 2 there appears a cylinder 51 assumed to be mounted on a portion 52 of the truck which is not spring-borne. In the cylinder 51 is a piston 53 biased downward by a coil compression spring as shown, and connected to a piston rod 54 whose upper end serves as a stop. Mounted on a spring-borne portion of the truck is the housing 55 of an adjustable pressure reducing relay valve. This has a ratio-adjusting plunger 56 biased downward by a coil compression spring as shown. The plunger 56 is alined with the rod 54 and when the rod 54 is forced upward to its limiting position, as it is during the load-sensing operation, the vertical position of the plunger 56 is determined by the amount the spring-borne portion of the truck is depressed by load. On an empty car the plunger 56 will not be lifted at all. On a loaded car, it would be lifted to its upper limit of functional motion. Partial loads would entail proportioned partial motion. An adjustable head 57 is provided on the lower end of the plunger 56 to permit initial adjustment of the action of the relay.

The plunger 56 carries a fulcrum roller 58 which coacts with a floating lever 59 analogous to the fulcrum roller 13 already described. The floating lever 59 is sustained by a drag link in exactly the way the lever 15 is sustained. It is associated with a variable ratio relay essentially identical with that described with reference to Fig. 1.

The stem 61 is the analogue of the stem 26 and the stem 62 is the analogue of the stem 33. The chamber 63 behind the diaphragm associated with stem 62 is connected with supply chamber 64 and with the pipe 65. This pipe also leads to the space in cylinder 51 below piston 53. The chamber 66 is functionally the analogue of the chamber 23 and is connected to the pipe 67.

Installation on one truck only

In a single truck installation the pipe 65 is connected directly to the pipe 68 and the pipe 67 is connected directly to the pipe 69. The pipe 68 is connected to a passage in the housing of the compensating valve which leads directly to the space to the right of piston 17. Consequently, pressure in the pipe 68 and connected pipe 65 is controlled by valve 39 according to the cycle already described. The pipe 69 leads directly to the space at the left of piston 19.

It will be apparent that under "no load" conditions the stop 54 will not move the plunger 56 and the fulcrum roller 58 will be in its lowest position. Consequently, the relay in Fig. 2 would then transmit to the piston 19, no pressure at all, or a very low pressure, the degree being a matter of design. However, with a loaded car the stop 54 will move the plunger 56 up a distance corresponding to the load and the relay will develop in pipe 67 and connected pipe 69 a corresponding pressure. This will cause the piston 19 to move to the right against the resistance of spring 18 a distance proportional to the pressure and approximately proportional to the load.

It should be observed that the relay in Fig. 2 is reversely arranged as compared with the relay in Fig. 1. In Fig. 2 the roller is near one end of the lever at "no load" and moves toward the middle with increasing load. In Fig. 1 the roller is near the middle of the lever at "no load" and moves toward one end in response to increasing load. The force ratio between the two ends of a first-class lever does not change proportionally to the shifting of the fulcrum and for this reason the operation of neither relay, individually considered, can be precisely in accordance with load. With the two relays reversely arranged, the errors which one introduces neutralize, or approximately neutralize, the errors introduced by the other. Hence, the reversed arrangement just mentioned is functionally important. It makes it unnecessary to use a cam or other mechanism to correct for the non-linear characteristics of the lever mechanism. Hence, piston 19 can be mounted directly on rod 14.

Dual sensing with selector valve

Fig. 3 shows an identical relay and parts in Fig. 3 are given the same numerals as those in Fig. 2 increased by 100. Referring now to Fig. 4 and assuming that it is interposed between Figs. 2 and 3 as contemplated, the selector valve can be described. This comprises a body 71 with caps 72 and 73 which confine the margins of flexible diaphragms 74 and 75. A hub 76 is connected with the centers of both diaphragms and carries two reversely set check valves 78 and 79. These are biased in a closing direction by an interposed light compression spring 77 heavy enough to hold the valves closed against pressures of the order of 2 p. s. i. The stems of the valves project far enough to collide with the cap 72 or 73 as the case may be. Assume that the relay in Fig. 3 develops in pipe 167 a pressure which is higher than the pressure developed in pipe 67 by the relay of Fig. 2. The valve 79 will remain closed until the motion of the diaphragms 74 and 75 to the left forces valve 78 open. This occurs because the pressure differential operates on the large diaphragm area. The effect is to shut off pipe 167 while connecting pipe 67 with pipe 69.

To make sure that the space between the diaphragms 74 and 75 is vented at the end of the load-sensing cycle, a check valve 81 is used. This valve could lead either to the pipe 67 or the pipe 167. Its purpose is to permit exhaust flow from the space between the diaphragms 74 and 75 through the exhaust valve of one of the relay valves shown in Figs. 2 and 3.

Dual sensing with averaging valve

It remains to consider the averaging relay valve of Fig. 5. Assuming that Fig. 5 is assembled with the remaining figures as above specified, the pipe 67 leads to the space below the diaphragm 82 and pipe 167 leads to the space below the diaphragm 83. These diaphragms react on levers 84 and 85 which conjointly engage the stem 86 of a relay valve 87. This is functionally the same as the relay valve actuated by the stem 26 in Fig. 1. The levers 84 and 85 are dimensioned to give a two-to-one force reduction. Consequently, the stem 86 of the relay valve is urged upward with a force which is the average of the forces developed by the diaphragms 82 and 83. The relay valve 87 receives its air supply from the pipe 68 and develops in the connected pipe 69 a pressure which is the average of pressures simultaneously existing in the pipes 67 and 167.

Operation of dual sensing system with selector valve

It will be recalled that as pressure rises from atmospheric to 45 lbs. in the chamber of slide valve 42, this valve goes through a cycle in which it first causes disengagement of latch 35 and then develops pressure to the right of piston 17. The pressures so developed will become effective in the pipe 68 and consequently in the pipes 65 and 165. As a consequence, the stops 54 and 154 move to their uppermost positions and set the relay valves in the housing 55 to develop pressures which are proportionate to the load on the respective related trucks.

The pressures so developed are effective in the pipes 67 and 167 and the switch valve shown in Fig. 4 connects the pipe having the lower pressure to the space to the left of piston 19. As a consequence, the rod 14 is moved to the right a distance proportioned to the load on the more lightly loaded one of the two trucks. This all occurs before pressure in the cut-off slide valve chamber attains the limiting value of 45 lbs.

When that value is reached, the valve 42 first vents the space below the diaphragm 37 and insures engagement of the latch 35. It then vents at a delayed rate the space to the right of piston 17 permitting this to retreat. Simultaneous gradual venting of line 68 occurs. Upon venting of the spaces below the pistons 53 and 153, the stops 54 and 154 retreat, the load-sensing relays of Figs. 2 and 3 move to exhaust positions and the lines 67 and 167 are vented. To vent the line 69, in this particular embodiment, the presence of the check valve 81 is desirable. It opens and permits the line 69 to be vented through the exhaust of the connected one of the two relays, in this case the relay shown in Fig. 2.

In the foregoing description the cut-off valve has been described as so arranged that it completes its cycle when pressure in the cut-off slide valve chamber reaches the value of 45 p. s. i. This value is empirically chosen as reasonably below the running pressure in the brake pipe. Completion of the cycle entails venting of the space to the right of diaphragm 45. When this has occurred diaphragm 44 and valve 42 will remain to the right until pressure in the chamber of slide valve 42 falls below say 20 p. s. i. Hence, no service reduction of brake pipe pressure can condition the device to sense load.

I claim:

1. For use with a load compensated air brake of the type including a normally charged brake pipe and an automatic brake-controlling valve device, the combination of a variable ratio relay connected to modify, in a correspondingly variable degree, the intensity of brake applications produced by said brake controlling valve device; a member shiftable to adjust the ratio setting of said relay progressively between no-load and load settings; a cut off valve arranged to operate in response to brake pipe pressure as the latter rises from atmospheric to a value below that corresponding to full charge, and in so doing develop a similar pressure and then dissipate the developed pressure; a normally engaged latch serving to fix said shiftable member in its adjusted positions; latch releasing means operable by said developed pressure; normally inert biasing means arranged to be loaded by said developed pressure and then serving to urge said shiftable member toward said no load position; an adjusting piston arranged to move said shiftable member in opposition to said biasing means to an extent proportioned to the pressure reacting on the piston; a variable ratio relay valve arranged to be adjusted according to load; and means controlled by said developed pressure for energizing said relay valve and causing it to deliver to said piston air at a pressure determined by load.

2. The combination defined in claim 1 in which said shiftable member shifts the fulcrum of a first class lever and the load adjusted relay is also adjusted by shifting the fulcrum of a first class lever, and the parts are so arranged that in shifting from no load toward load position one of said fulcrums is shifted toward an end of its lever and the other toward the middle of its lever.

3. The combination defined in claim 1 in which the load-adjusted variable relay and the means which energize it comprise two separate coacting units one mounted in a spring borne part of a truck and the other on a part which is not spring borne, and the energizing means comprises a normally retracted piston which is moved to active position by said developed pressure and then serves to engage and position the adjustable element of the relay.

4. The combination defined in claim 1 in which two load-adjusted variable relays are used, one on each of two car-trucks, and automatic valve means are interposed between the two and the piston and serve to control the pressure delivered to said piston at least when the pressures delivered by the load-adjusted relays are unequal.

5. The combination defined in claim 1 in which two load-adjusted variable relays are used, one on each of two car-trucks and a selector valve is interposed in the connection to said piston, and is arranged to function in response to differentials between pressures delivered by said two relays and isolate from the piston that relay which delivers the higher pressure.

6. The combination defined in claim 1 in which two load-adjusted variable relays are used, one on each of two car-trucks and an averaging valve interposed in the connection to said piston and serving to deliver to the piston air at a pressure which is the average of the pressures delivered by said two relays.

7. The combination defined in claim 1 in which the normally inert biasing means is a spring sustained by a piston subject to said developed pressure and movable thereby to a fixed position.

LYNN I. PICKERT.

REFERENCES CITED

The following references are of record in the file of this patent:

UNITED STATES PATENTS

| Number | Name | Date |
|---|---|---|
| 717,286 | Sauvage | Dec. 30, 1902 |
| 1,809,069 | Sanford | June 9, 1931 |
| 2,173,928 | Borde et al. | Sept. 26, 1939 |
| 2,395,170 | Cotter | Feb. 19, 1946 |
| 2,408,123 | Pickert | Sept. 24, 1946 |